No. 760,414. PATENTED MAY 24, 1904.
I. BENTLEY.
SUGAR BEET TOPPER, DIGGER, AND SCREENER.
APPLICATION FILED JAN. 23, 1903.
NO MODEL.
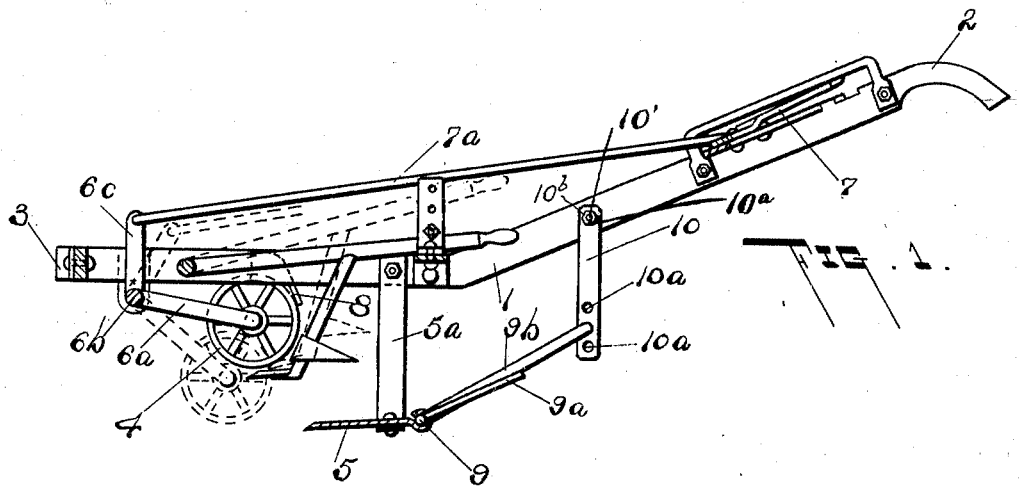
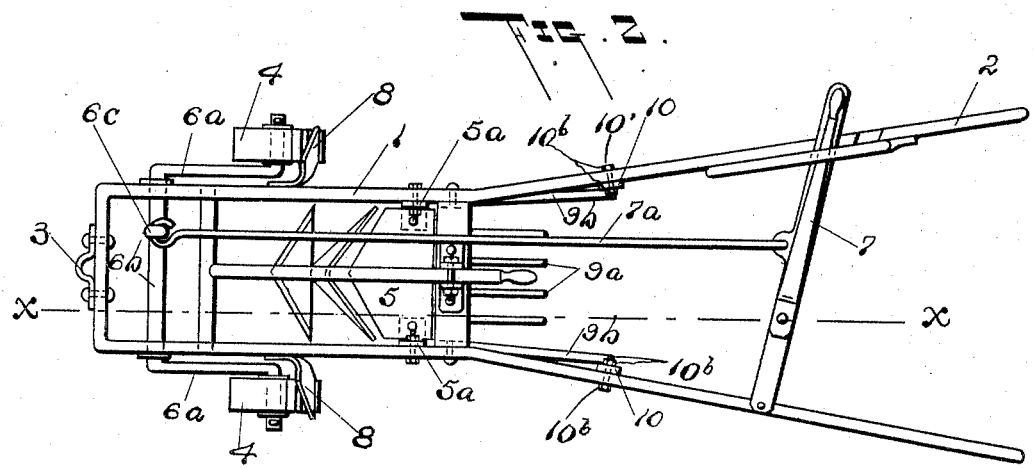
WITNESSES:
P. M. Holdsworth.
Frank Martindale
Ira Bentley. INVENTOR
BY
Geo. B. Willcox, ATTORNEY No. 760,414. Patented May 24, 1904.

UNITED STATES PATENT OFFICE.

IRA BENTLEY, OF GLOVER, MICHIGAN.

SUGAR-BEET TOPPER, DIGGER, AND SCREENER.

SPECIFICATION forming part of Letters Patent No. 760,414, dated May 24, 1904.

Application filed January 23, 1903. Serial No. 140,288. (No model.)

*To all whom it may concern:*

Be it known that I, IRA BENTLEY, a subject of the King of Great Britain, residing at Glover, in the county of Bay and State of Michigan, have invented certain new and useful Improvements in Sugar-Beet Toppers, Diggers, and Screeners; and I do hereby declare the following to be a full, clear, and exact description of the invention, such as will enable others skilled in the art to which it appertains to make and use the same.

This invention relates to beet-harvesters, and has for its object to provide a device of this nature which will remove beets from the ground, separate them from loose earth, and deposit them behind the machine in rows in condition to be gathered and marketed.

In the drawings forming a part of this specification, and in which like numerals of reference indicate similar parts in both views, Figure 1 is a section on line $xx$ of Fig. 2, and Fig. 2 is a top plan view of the entire device.

Referring now to the drawings, there is shown a harvester comprising spaced sills 1, diverging at their rearward ends and terminating in handles 2. The forward end of the machine is occupied by a gage mechanism comprising wheels 4, supporting-rods $6^a$, and a shaft $6^b$, carrying an upright $6^c$, to which there is attached a rod $7^a$, connected to a lever 7 for varying the position of the gage-wheels. A clevis 3 is attached to the forward end of the machine, and scrapers 8 are mounted upon the sills 1 to remove the earth from the wheels. Rearwardly of the gage mechanism there is mounted a topping-blade for removing the leaves from the beets. The mechanisms just described are such as may be applied to any machine of the present class. Rearwardly of this mechanism and attached to each of the sills 1 are depending bars $5^a$, which support a blade 5, to the rear edge of which is hinged a bar 9, carrying a plurality of rearwardly-extending spaced fingers $9^a$. To each end of the bar 9 there is rigidly attached a rod $9^b$, having its outer end turned at right angles to itself and adapted for engagement with perforations $10^a$ in a plate 10, which depends from the sill 1. It will be understood that there are two of these plates 10, one depending from each sill, to which they are attached by means of bolts $10'$, which allows a pivotal movement of the plates 10. These plates may be clamped in any position, however, by means of the nuts $10^b$, as shown.

The hinged connection of the bars 9 and the blades 5 makes it possible to vary the position of the fingers $9^a$, and they may be held at any desired point by engaging the end of the rod $9^b$ with the correct perforation $10^a$, the pivotal movement of the plates 10 making this possible. For different soils the fingers $9^a$ are adjusted at different angles. For heavy soils they are raised to nearly the perpendicular, and for light soil they are lowered toward the horizontal, thus insuring removal of the maximum amount of earth under all conditions.

The beets are dug from the ground by the blade 5 and ride up over the fingers $9^a$ and fall to the ground over their ends. By reason of the pressure of new beets dug by the blades the beets are kept in motion, while the earth passes through the fingers and falls to the ground.

In practice any desired materials and proportions may be used without departing from the spirit of the invention.

What is claimed is—

1. A beet-harvester comprising spaced sills, a blade suspended from the sills, spaced fingers hinged to the blade projecting rearwardly therefrom, rods connected with the spaced fingers, plates pivotally attached to the sills and depending therefrom, and having a plurality of perforations therethrough, the rods being adapted for engagement with the perforations interchangeably to vary the angle of the fingers.

2. A harvester comprising spaced sills, a blade suspended from the sills, a rod hinged to the rearward edge of the blade, spaced fingers projecting rearwardly from the rod, plates pivoted to the sills and depending therefrom, and having a plurality of perforations therethrough, rods connected to the fingers at one end and adapted for engagement of their free
5 ends with the perforations of the plates interchangeably, to vary the angle of the spaced fingers.

In testimony whereof I affix my signature in presence of two witnesses.

IRA BENTLEY.

Witnesses:
JAMES C. HANSON,
A. A. EASTERLY.